United States Patent [19]

Ulinski, Sr. et al.

[11] Patent Number: 4,699,531
[45] Date of Patent: Oct. 13, 1987

[54] SELF-CORRECTING PRINTER-VERIFIER

[75] Inventors: Richard J. Ulinski, Sr., Monrovia; Hugh C. Clarke, Arcadia; Richard A. Evers, Monrovia, all of Calif.

[73] Assignee: RJS Enterprises, Inc., Monrovia, Calif.

[21] Appl. No.: 919,541

[22] Filed: Oct. 14, 1986

Related U.S. Application Data

[63] Continuation of Ser. No. 676,571, Nov. 30, 1984.

[51] Int. Cl.$^4$ .............................................. B41J 3/20
[52] U.S. Cl. ..................................... 400/74; 400/120; 400/103; 346/76 PH
[58] Field of Search ................ 400/120, 74, 249, 210, 400/121, 54, 95, 73, 103–107; 346/76 PH

[56] References Cited

U.S. PATENT DOCUMENTS

| 4,300,142 | 11/1981 | Kos | 346/76 PH |
| 4,339,208 | 7/1982 | Biedermann | 400/124 |
| 4,422,376 | 12/1983 | Teraoka | 400/120 X |
| 4,442,342 | 4/1984 | Yoneda | 400/120 X |
| 4,500,893 | 2/1985 | Sakura | 400/120 X |
| 4,504,160 | 3/1985 | Payne | 400/196.1 |

FOREIGN PATENT DOCUMENTS

| 1624 | 1/1979 | Japan | 400/704 |
| 4144 | 1/1979 | Japan | 400/120 |
| 27779 | 2/1982 | Japan | 400/54 |
| 129216 | 8/1983 | Japan | 346/76 PH |

OTHER PUBLICATIONS

*IBM Tech. Disc. Bulletin,* by T. H. Long, vol. 25, No. 4, Sep., 1982, pp. 1982–1983.

*Primary Examiner*—Paul T. Sewell
*Attorney, Agent, or Firm*—Thomas A. Turner, Jr.; Seymour A. Scholnick

[57] ABSTRACT

Indicia having a requirement for a high degree of precision is printed onto a sheet and is scanned or read automatically shortly thereafter. Electronic control signals result from a comparison of the actually printed indicia with a pre-defined quality standard, and are used selectively to adjust command control signals to the printer to correct indicia printed thereafter. The leading edge of sheets to which the indicia is to be printed is precisely located by a light absorption detection or sensing mechanism which controls a sheet advance motor. The indicia printed, preferably bar code, is read by an optical bar code scanner traversing the printed code. The scanner is controlled by a scanner microprocessor control, and the printer is controlled by a printer microprocessor control which controls a comparison of the scanned code with a set quality standard to result in output signals to control the printer microprocessor control in a feedback loop to increase or to decrease the time of voltage application to printing elements in a thermal printer.

17 Claims, 19 Drawing Figures

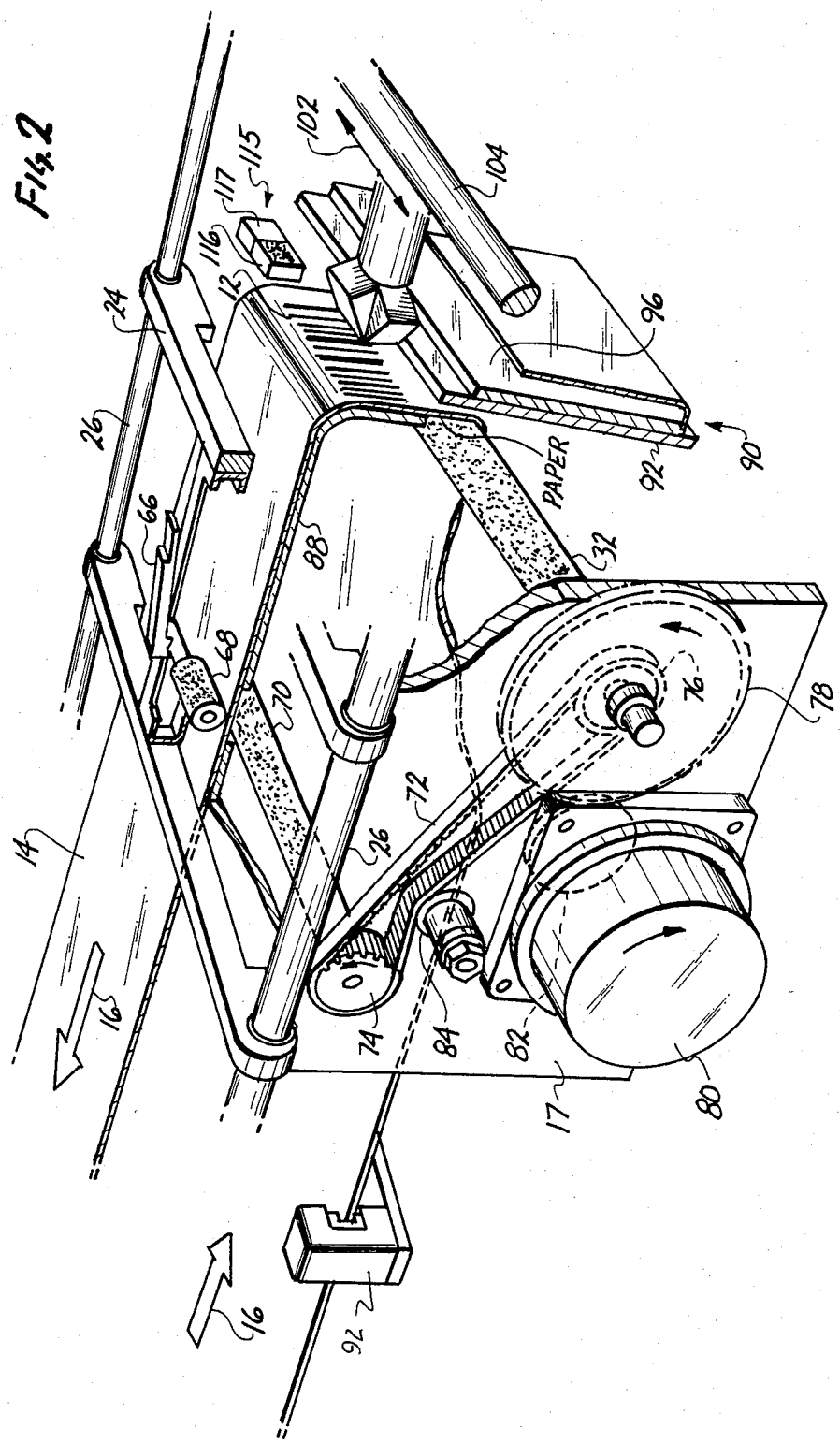

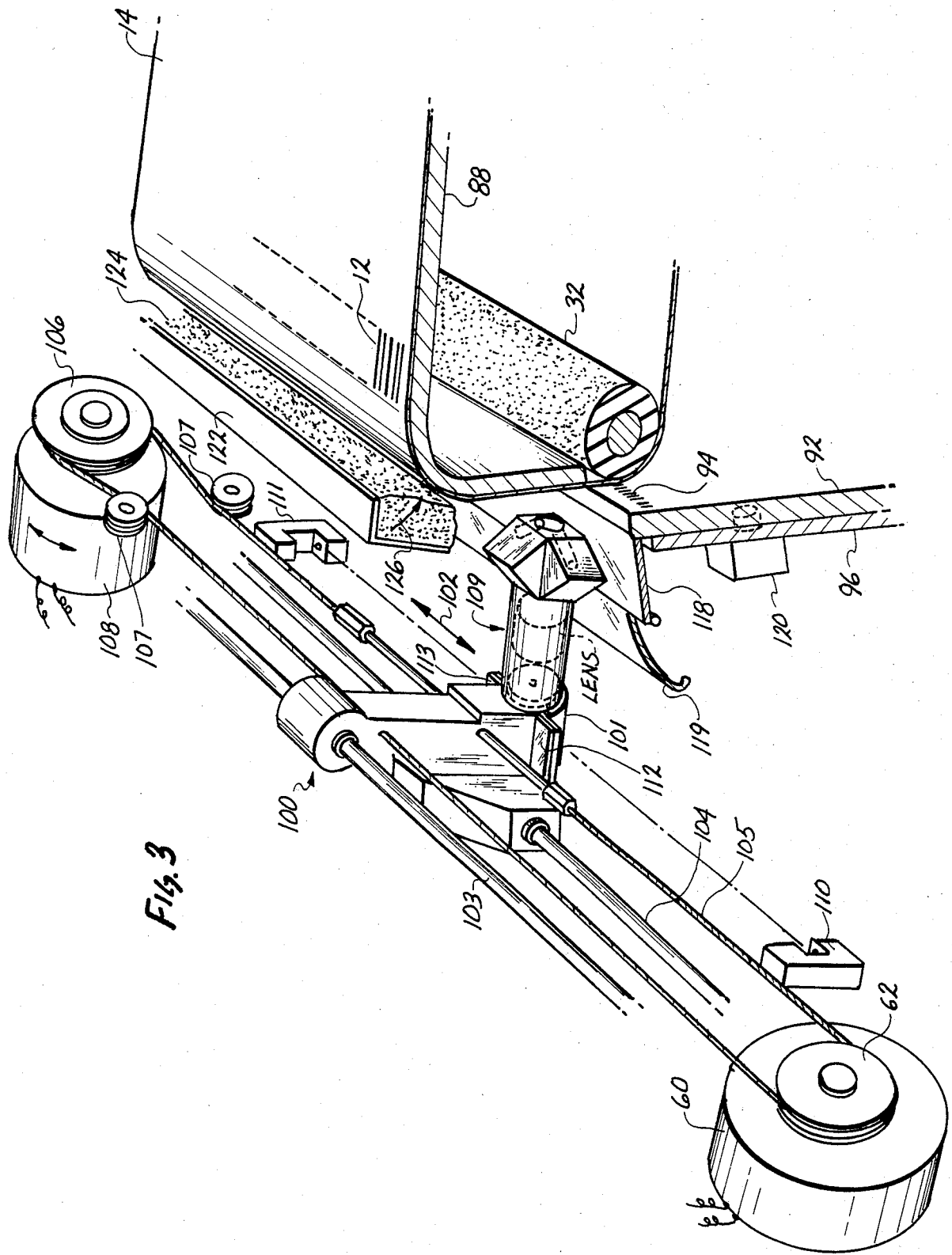

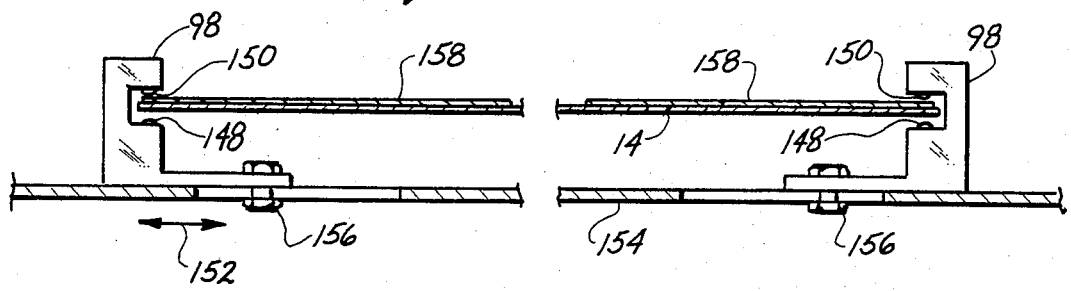
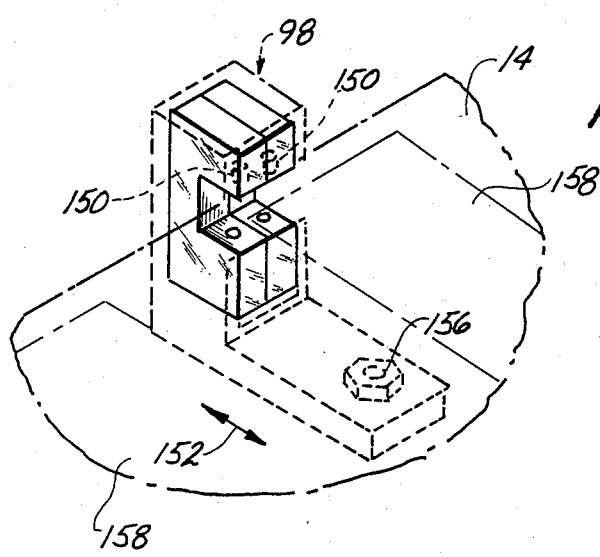
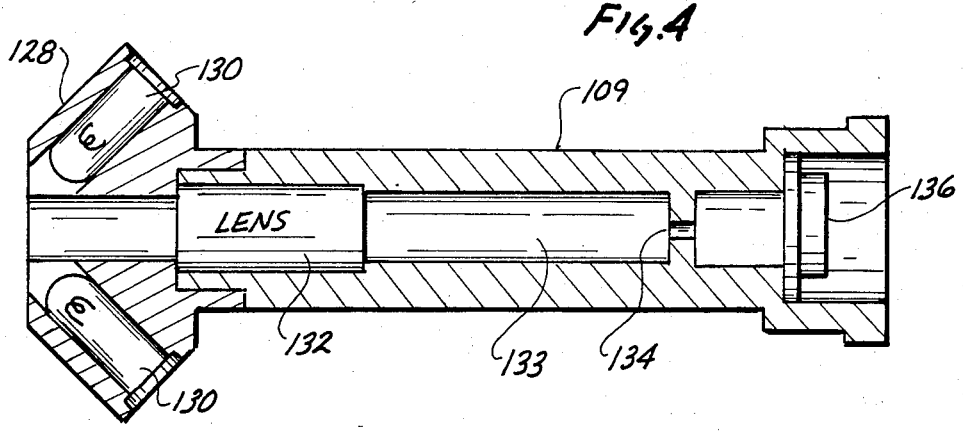

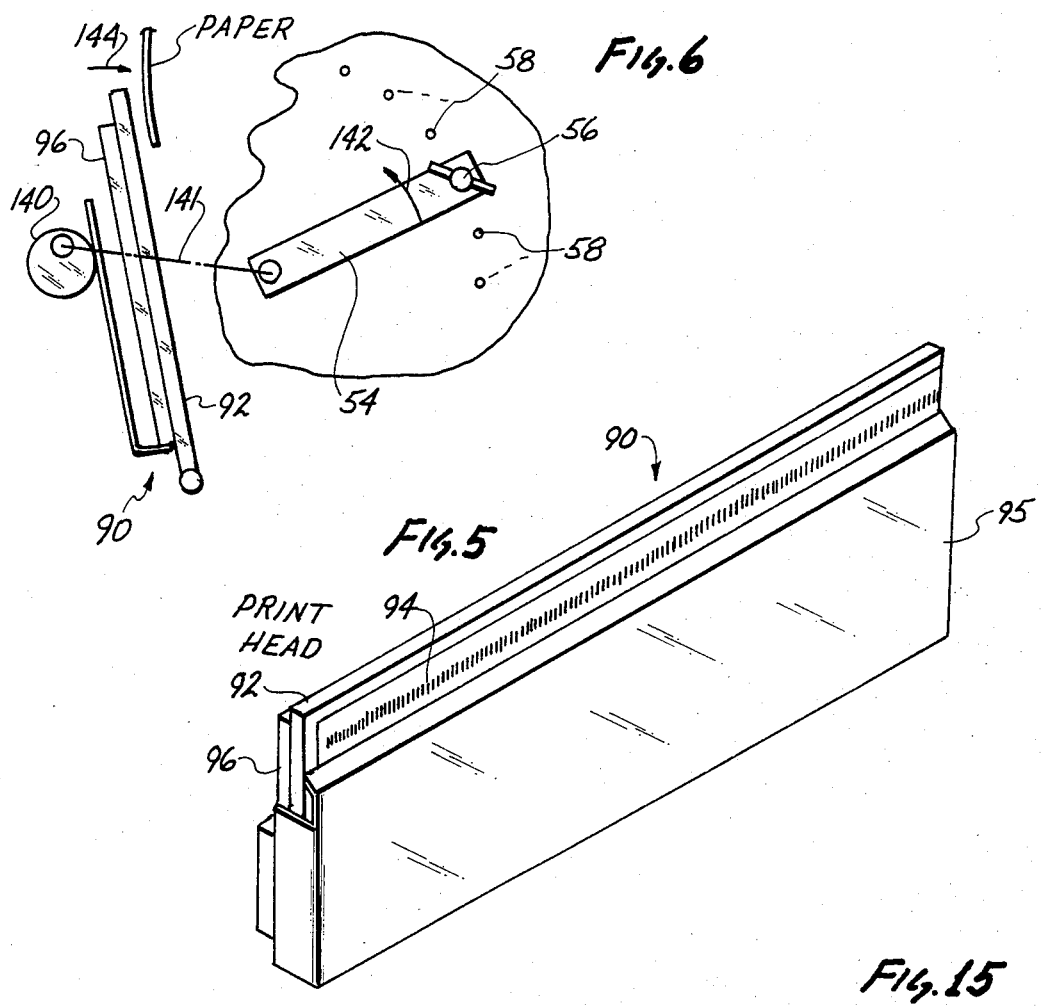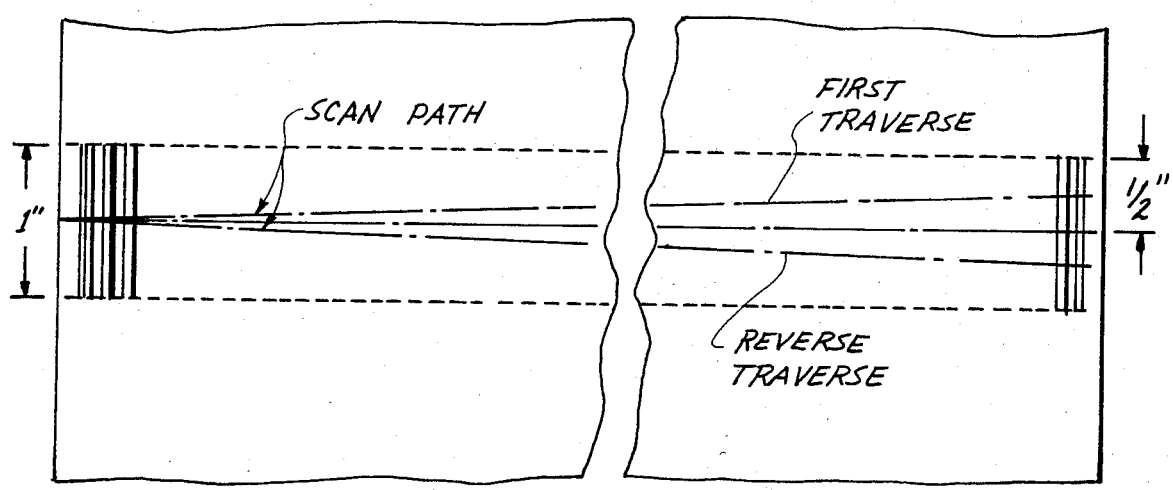

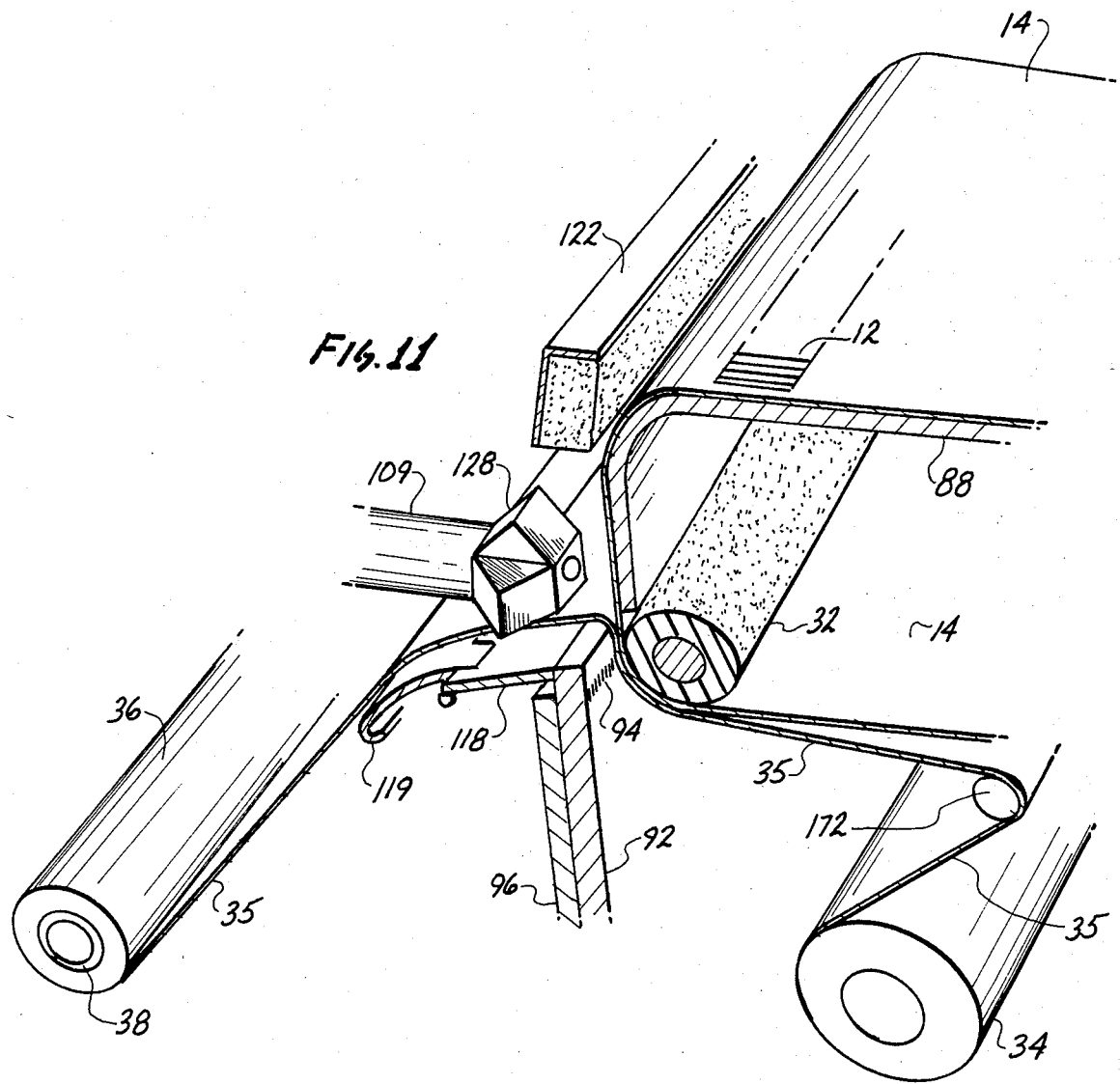
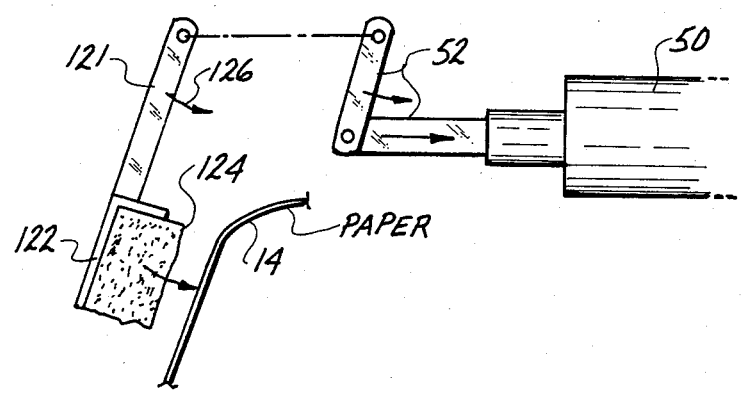

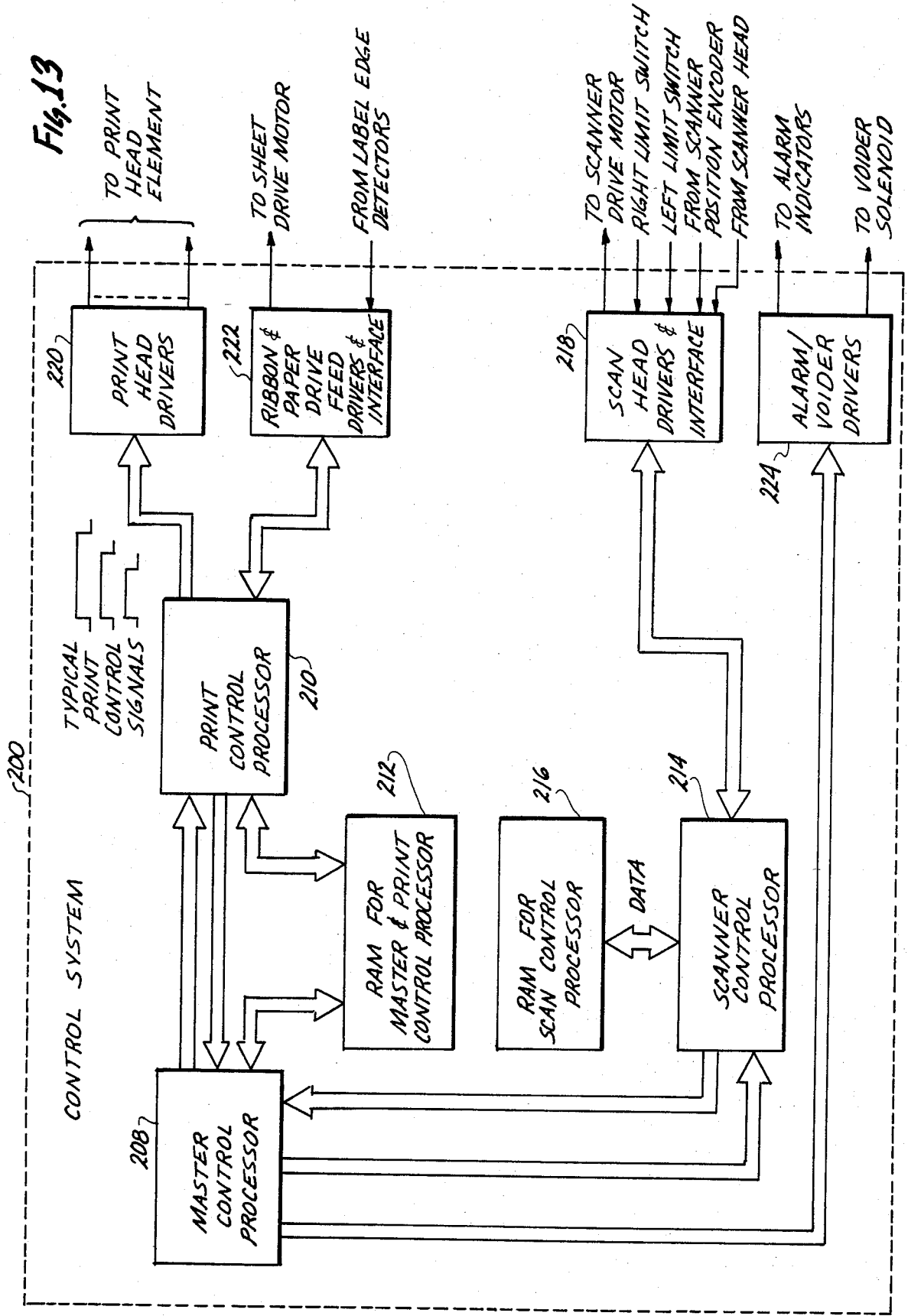

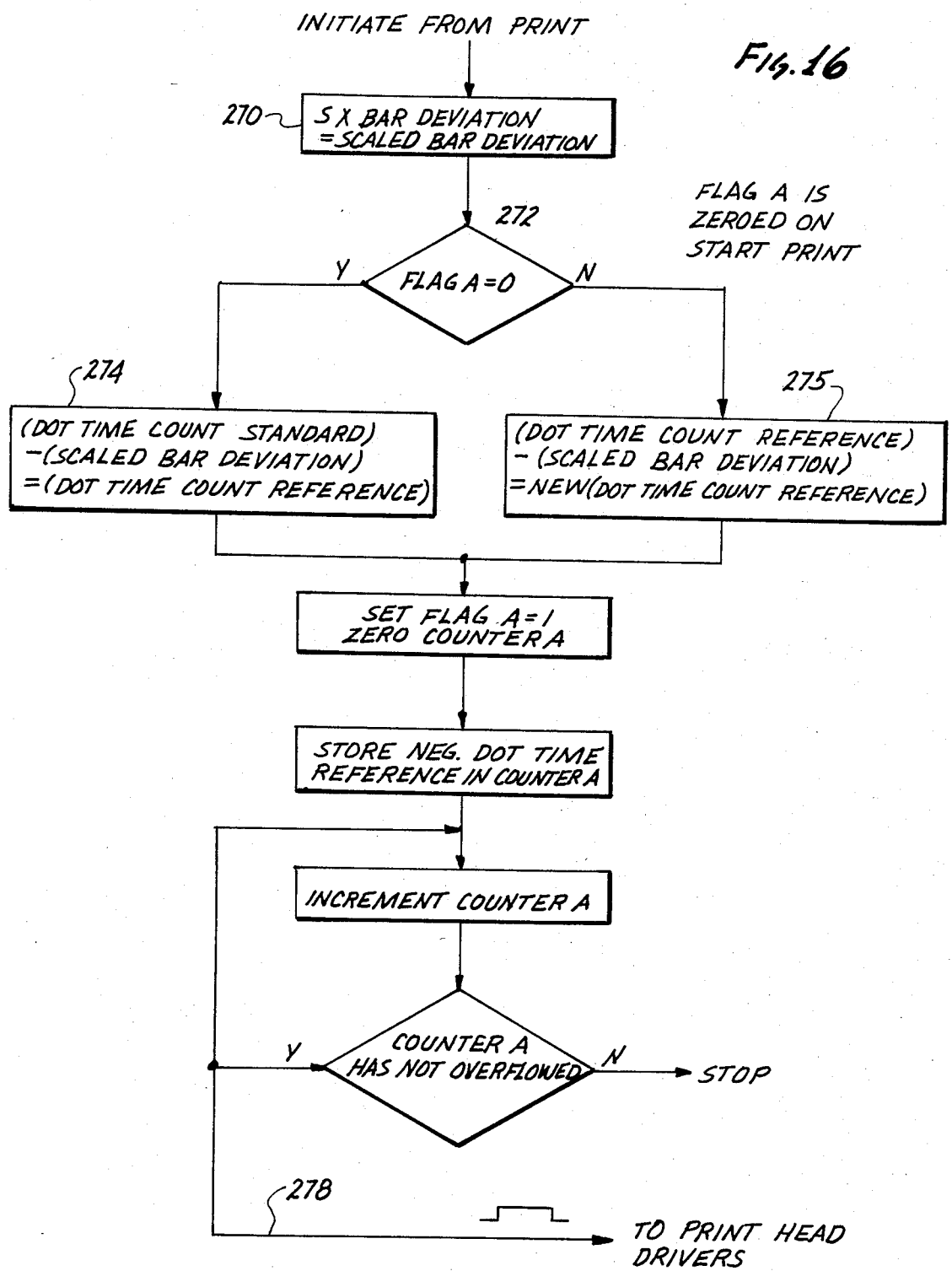

Fig. 17

VERIFY PRINT QUALITY BUFFER

|  | ← 32 BITS → | | | |
|---|---|---|---|---|
| 1ST SYMBOL | MINIMUM PCS | MINIMUM CONTRAST | LIGHT MIN. STANDARD | LIGHT MAX. STANDARD | LIGHT SPEC |
| | +TOL. | -TOL. | NOMINAL DIMENSION | | 1ST BAR |
| | +TOL. | -TOL. | NOMINAL DIMENSION | | 1ST SPACE |
| | +TOL. | -TOL. | NOMINAL DIMENSION | | 2ND BAR |
| | +TOL. | -TOL. | NOMINAL DIMENSION | | 2ND SPACE |
| | +TOL. | -TOL. | NOMINAL DIMENSION | | NTH BAR |
| | 0 | 0 | 0 | | END OF SYMBOL |
| SYMBOLS 2 THRU N | MINIMUM PCS | MINIMUM CONTRAST | LIGHT MIN. STANDARD | LIGHT MAX. STANDARD | LIGHT SPEC. |
| | +TOL. | -TOL. | NOMINAL DIMENSION | | 1ST BAR |
| | +TOL. | -TOL. | NOMINAL DIMENSION | | 1ST SPACE |
| | +TOL. | -TOL. | NOMINAL DIMENSION | | 2ND BAR |
| | +TOL. | -TOL. | NOMINAL DIMENSION | | NTH BAR |
| | 0 | 0 | 0 | | END OF BUFFER |
| | 0 | 0 | 0 | | |

Fig. 19

PRINT DEVIATION BUFFER

PRINT DEVIATION CALCULATIONS COMP.
OUT OF SPEC. FLAGS:
PCS
LIGHT
DARK

| ← 16 BITS → | |
|---|---|
| AVERAGE BAR DEVIATION | 1ST SYMBOL DEVIATION DATA |
| COUNT OF BARS OR SPACES OUT OF SPEC. | |
| COUNT OF BARS OR SPACES > GROSS TOTAL | |
| | REPEATED FOR EACH SYMBOL |

SELF-CORRECTING PRINTER-VERIFIER

This is a continuation of co-pending application Ser. No. 676,571 filed on Nov. 30, 1984.

BACKGROUND ON THE INVENTION

1. Field of the Invention:

The present invention relates to the art of printing, and more particularly to apparatuses and methods for printing and verifying precision of bar codes, and correcting subsequent prints of bar codes on labels and sheets.

2. Description of the Prior Art:

Bar codes in various forms are now familiar as identifying and pricing indicia for various commodities and material, and are used to record pricing information and material handling and locating information on commodities and products in applications as varied as grocery store checkouts and inventory control. Bar codes typically comprise vertical bars of dark, non-reflective lines of varying widths interspaced by highly light reflective spaces of varying widths. A group of such bars and spaces, representing a "symbol" is scanned by optical scanners reflecting light off the bars and spaces to photodetectors which distinguish the difference between the dark bars and the reflective spaces, and of their relative widths.

To distinguish between the relative widths of bars and of spaces, processing of the information from the scanned code must distinguish the time of the scanner's pass over of the bars and spaces. Usually, great tolerances must be afforded to the different, varying widths in order to accommodate a substantial variability in the speed or velocity of the optical scanner, and to accurately distinguish between bars, or non-reflective areas and spaces, or highly reflective areas.

It is greatly desired to reduce the widths of the bars and spaces generally conceded to tolerances without sacrificing accuracy in the optical scanning, in order to increase the information in a given space and to increase the reliability of the information read-out in the scanning procedure. For example, it has been shown to print an alignment mark to trigger the commencement of an optical bar code scanning at a precise point, with the objective of reducing the symbol space, as is shown in U.S. Pat. No. 4,349,741 to Bobart et al., where the alignment mark is scanned contemporaneously with the printing so as to position the scanner at the center of the bar code, and thus increase the accuracy in the scanning of the code.

Thermal printers have been known and preferred in many applications where non-impact printing is a desired goal. Thermal printers are characterized by the controlled application of precise amounts of heat, either by a print element head or pixel to a paper sensitive to the temperature to produce an optically readable print, or to a thermally sensitive ribbon adjacent the paper to be printed, in which by the application of heat to the ribbon, optically readable material is melted onto the paper. In such thermally sensitive printing, precision in the temperature of the printing elements is important. Methods and apparatuses for sensing the temperature and correcting or controlling the temperature to the print head in response to the sensed temperature have been described, for example, in the dot matrix printer controls of U.S. Pat. No. 3,577,137 to Brennan, Jr. and U.S. Pat. No. 4,449,033 to McClure, et al.

While greatly improving the quality of thermal printing, it is still desired to have an apparatus which self-corrects the precise widths of the bars and spaces in a bar code during the printing process in response to a contemporaneous read-out of the immediately preceding printed code, and potentially independent of temperature sensing. It is further desired to have a bar code printer having contemporaneous read-out and verification of the printed code, and automatic rejection of code which does not fit within pre-defined width dimension tolerances of precision for the bars and spaces. It is a further desired objective to have bar code printers automatically positioning the edge of labels to be printed in such a printing and verifying printer. It is desired yet further to have a printer with the self-correcting and contemporaneous verification features in a non-impact printer.

SUMMARY

In brief, in accordance with one aspect of the present invention, a non-impact bar code printer is described comprising a thermal printer combined with an optical scanning system for reading indicia, such as bar code imprinted on labels, longitudinally extended sheets and the like.

A longitudinally extended sheet normally having gummed labels mounted on the sheet is advanced through a thermal printer capable of applying heat directly to a thermally sensitive paper, or of applying heat to burn or melt thermally sensitive ribbon onto the sheet. The leading edge of the labels on the extended sheet is sensed by two successively positioned photodetecting paths sensing the degree of opacity of the paper passing through the light path. Differential voltage signals resulting from the initial passing of the leading edge through the first, but not the second of the detectors generates a differential signal from a differential amplifier, which signal is shaped and amplified to form a digital signal to a print control processor for advancing the label on the extended sheet through the thermal printer, and for initiating the print cycles at the correct time when the label is properly positioned juxtaposed the printing elements of the thermal printer.

A transport assembly holding a paper path tray and drive rollers is capable of movement in order to present easy access to the print area and to the area through which the paper must be initially fed. When moved into the print position, the transport assembly can be latched into place, and the print head can be variably positioned so as to apply more or less pressure against the sheets to be printed. A control panel and readout display provide operational accessibility to the functioning of the printer and verifier.

Integral with the printer is an optical scanner positioned to transversely scan the sheet subsequent to the printing operation. The scanner and printer are controlled by a master control processor, in turn controlling a scanner control processor and a print control processor. By use of stepper motors, two drive rollers advance the sheet so that the area, such as the label to be imprinted is precisely positioned juxtaposed printing elements of a thermal line printer. The printing elements or pixels on the print head are driven by print head drivers controlled by the print control processor in the control system. Data is input to a master control processor from a disk terminal or other computer, and a label description buffer is created so that the master control processor can set up the print control processor.

After printing, the printed sheet is scanned by an optical scanner driven by a scanner stepper drive motor transversely from one side to the other side of the printed sheet. In a first pass, the optical scanner establishes a reflectivity threshold by determining peaks or averages of reflectivity in the printed code. In the reverse pass, the widths of the individual bars and spaces are measured, and the measurement dimensions sent through a scan head driver and interface to a scanner control processor, thence to a measured data buffer or memory. The scanner is limited in its transverse pass by a right limit switch and a left limit switch each comprising a light path in a photodetector circuit interrupted by flanges on the scanner head assembly. At the left limit switch, the direction of the scanner assembly on its path defined by the scanner cable is reversed. At the right limit switch, the scanner assembly stops in a nesting position with the reading head reading a calibration plaque for calibrating the detection circuit of the scanner.

The master control processor has established in a verified print quality buffer the standard widths which the individual bars and spaces of the printed code should have, and compares the actually measured dimensions of the bars and spaces with the standard. A deviation between the actually measured dimensions and the standard dimensions is established, and recorded in a print deviation buffer or memory. Averages are taken of the deviations, and if these averages exceed a predetermined tolerance limit, a correction signal is generated to modify the time pulse at the print head drive signal selection in the print control processor to increase or decrease the voltage application time for the individual print elements for the bars in the symbol found to be intolerably deviant from the standard.

The control system through a master control processor can generate signals to actuate a "void" stamp solenoid to brand the rejected label, and to actuate other alarm indicators as may be desired. Further, a command is generated to cause the printer to re-print the rejected label or page.

Other novel features which are believed to be characteristic of the invention, both as to organization and method of operation, together with further objects and advantages thereof, will be better understood from the following description considered in connection with the accompanying drawings in which a preferred embodiment of the invention is illustrated by way of example. It is to be understood, however, that the drawings are for the purpose of illustration and description only, and are not intended as the definition of limits of the invention.

BRIEF DESCRIPTION OF THE DRAWINGS

FIG. 2 is another perspective view of the printer and verifier of FIG. 1, having certain elements removed and others cut-away for clarity;

FIG. 3 is a detailed perspective view of the scanning head and printing elements of the preferred embodiment of the invention of FIG. 1;

FIG. 4 is a side elevational, cross-section view of the optical scanning head of FIGS. 2 and 3 of the preferred embodiment;

FIG. 5 is a perspective view of the print head of the preferred embodiment of the invention;

FIG. 6 is a detailed side elevation view of the pressure setting arm of the preferred embodiment of FIG. 1;

FIG. 7 is a front elevation view of the sprocket and label edge detector of the preferred embodiment;

FIG. 8 is a perspective view of the sprocket and label edge detector of FIG. 7, showing the interior detector elements and the overall casing in broken line for clarity;

FIG. 10 is a detailed side elevation view of the "void" solenoid and linkage of the preferred embodiment of FIG. 1;

FIG. 11 is a perspective view of the scanning head and printing elements of the preferred embodiment in an alternative mode of operation;

FIG. 13 is a block schematic diagram of the control system of the preferred embodiment;

FIG. 15 is a path diagram of the optical scanning path of the preferred embodiment;

FIG. 16 is a flow diagram of the processes of the correction signal generation of the present invention; and FIGS. 17, 18 and 19 are map diagrams of memory buffers within the process control of the preferred embodiment of the present invention.

DESCRIPTION OF THE PREFERRED EMBODIMENT

Figure 1:
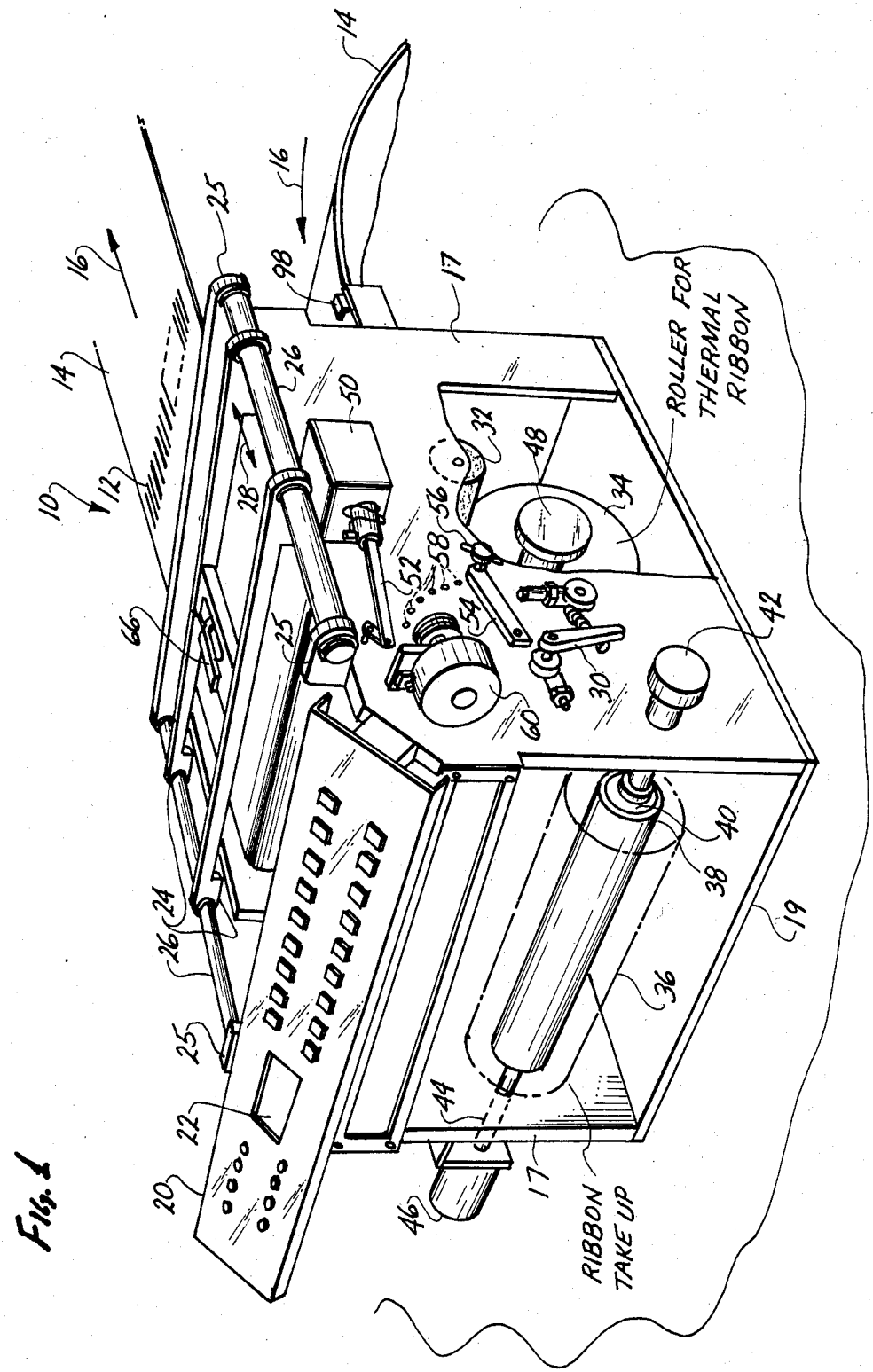
FIG. 1 is a perspective view of a printer and verifier of the preferred embodiment of the present invention.

Initially referring to FIGS. 1 and 2 of the drawings, a self-correcting printer and verifier 10 for printing indicia, such as a bar code 12 on a longitudinally extended sheet 14 is depicted in perspective view. The sheet 14 travels in the direction of arrows 16 through the printer-verifier 10 from a row or a fanfolded stack of edge connected sheets forming an indeterminate length of paper, often times sprocketed on the linear edges for advancement by sprocket wheels. The paper may be thermally sensitive paper of the kind which, when a certain level of heat is applied adjacent the paper will form marking or printing on the paper. As will be explained in greater detail below, other types of paper may also be used, such as an extended sheet of backing having a series of successive gummed labels mounted on it.

The printer and verifier 10 is comprised of printer chassis sidewalls 17 and a chassis base 19 in effect housing many of the operative elements, and providing mounting for substantially all of the elements. To the front of the printer 10, a control and display panel 20 including a read-out digital display 22 is shown.

A paper transport assembly 24 is shown movably mounted to the chassis sidewalls 17 on rails 26 to move forward and rearwardly in the direction of double arrow 28. The rails 26 are connected to the sidewalls 17 by chassis mounts 25. The transport assembly 24 may be secured in the forward or operating position by a convenient latching system, not shown which is released by latch lever 30.

A print head platen 32 is mounted to the transport assembly 24 for driving the paper 14 in the paper path, which will be explained in greater detail shortly. Mounted between the sidewalls 17, as depicted in FIG. 1 is a roll 34 of thermal printing ribbon 35 which is fed from a spool about which it is wrapped, to the take-up roll 36 for the printing ribbon, wrapped around spool 38.

The ribbon take-up roll spool 38 is held between the sidewalls 17 on one side by a ribbon take-up roll mandrel or cone 40, manipulated on the outside of the wall 17 by mandrel knob 42, and on the other side of the spool 38 by a mandrel or cone capable of being driven by shaft 44. Shaft 44 is driven by a ribbon tension servo 46. The motor current to the servo 46 is controlled by a signal responsive to a sensing of the tension of the printing ribbon 35, as more fully explained with reference to FIG. 11, below.

The feed roll 34 of printing ribbon 35 is similarly held between the sidewalls 17. On one side, as seen in FIG. 1, the ribbon mandrel or cone 48 engages the roll spool, and allows for relatively free rotation of the roll 34.

A solenoid 50 is connected by solenoid linkages 52 to drive a "void" stamp, as will be explained in greater detail below.

A print head pressure setting arm 54 can be rotated about its spindle, and fixed by set screw 56 at various set notches 58 for controlling the pressure of the print head 90 (FIG. 2) against the paper 14, as explained further below.

An optical head encoder 60 is mounted on a common shaft with a right optical head cable pulley 62 for providing accurate location information of the scanning head 100, again described in greater detail below.

A pinch roller lever 66 referring to FIGS. 1 and 2, operates as a cam for pinch roller 68 to pinch firmly paper 14 between it and a paper tension drive roller 70 operably positioned in the transport assembly 24.

In FIG. 2, the sheet advancing system is depicted in greater detail. A toothed timing belt 72 drives a sprocket wheel 74 which is axially connected to the paper tension drive roller 70. The timing belt 72 is driven by gear 76, which is connected to the gear 78. The gear 78 is driven by the paper drive motor 80 through gearing 82 connected to the shaft of paper drive motor 80. Gear 78 is axially connected to the print head platen 32 to provide the main driving force for the paper 14. An adjustable tension roller 84 is provided to control the tension of the toothed belt 72.

A paper path tray 88 is provided to guide the paper 14 along a proper paper path.

Print head 90, comprising a print head circuit board 92 holding the print elements 94 (FIG. 3) and a heat sink 96 is positioned in operable and printing relationship to the paper 14 opposite a vertical back wall of the tray 88.

A sprocket and label edge detector system 98 is depicted at a point at the beginning of the paper path where paper 14 enters into the paper transport assembly 24.

A scanning head 100 is movably positioned to read the bar code 12 printed on the paper 14 by traversing the lateral width of the paper 14 in the direction of arrows 102. As better seen in FIG. 3, the scanning head 100 comprises an optical slide assembly 101 slidably mounted on rail 103 and stabilized by slider assist guide 104. An optical head cable 105 is connected to the optical slide assembly 101, and is looped around head cable pulley 62 at the right end (as viewed from the front, and head cable pulley 106 at the left end. Tensioning pullies 107 are provided to maintain the head cable 105. The pulley 106 is mounted to the shaft of the scanner stepper drive motor 108.

An optical head or block 109 is mounted within the optical slide assembly 101.

Limit switches 110, 111 are positioned at each end of the scanner traverse path 102. Each limit switch 110,111 comprises a vertical light path, having a light emitting diode (LED) light source and a photodetector. The light path is positioned to be interrupted by one or the other of the flanges 112, 113 flaring from the optical slide assembly 101. The controller for the optical slide assemble receives the signal resulting from the interruption of the light path in either of the limit switches 110, 111, and stops the traverse of the scanner head 100. In the case of the left limit switch 111, the scanner head traverse is reversed, and the scanner head 100 commences a selective reverse scan of the printed matter. The scanner head 100 upon return to the right side stops upon interrupting, by its right flange 112 the limit switch 110, in its nesting position.

A calibration plaque 115 is provided having both a standard darkness area 116 and a standard reflectivity area 117. The dark area 116 is designed to reflect only two percent (2%) of light focused on it, while the highly reflective area 117 should reflect approximately 80% of light focused upon it. The calibration plaque 115 can be used, when the scanning head 100 is in its nesting position, to test or verify the operation of the light path and of the scanning and reading circuits. Additionally, the light reflectivity sensitivity of the scanner's photodetectors can be calibrated from the reflective plaque 117.

A ribbon strip plate 118 is provided with articulated tensioning arm 119 to guide the thermal printing ribbon 35, if used, from the paper 14 after a printing step. The tensioning arm 119 can provide, further, a signal to control the direct current ribbon tension servo 46, as will be explained more fully with reference to FIG. 11.

A "void" stamp or marker 122 comprises an ink pad 124, and is mounted to move in the direction of arrow 126 to engage the paper 14, as will be more fully explained with respect to FIG. 10. A thermister 120 is mounted to the heat sink 96 for use in temperature stabilization of the print head 90. Temperature control by sensing the heat sink temperature is not part of the preferred embodiment, but is shown for convenience.

In FIG. 4, the optical head or block 109 is shown in cross-section elevation. A light source mounting block 128 houses three light emitting diodes (LED's) providing light. Lens 132 is movably set within the light path 133. The lens may be fixed in any conventional manner as by a set screw, for example. The block 109 comprises, in addition, an aperture 134 for controlling flair of the light within the path 133. A photodetector 136 is at the end of the light path 133 to detect the contrast between the reflective and non-reflective surfaces scanned. The light source mounting block 128 is press-fit onto the optical block 109 in order to align the LED's 130 to the sheet 14 to be scanned, and to provide access to the lens 132 for movement in order to focus the image along the light path 133. The number of LED's is not crucial so long as a sufficient number of them is used to diffuse the illumination and make the light reflected independent of paper peculiarities, such as grain.

In FIG. 5, the print head 90 is depicted. The print head circuit board 92 contains the printing elements or pixels 94. In the preferred embodiment, 1728 pixels are linearly arranged along a single line at a distance of 0.5 mils apart, each pixel having a width of approximately 0.5 mils. A heat sink 96 comprising a metal block is mounted to the circuit board 92 having a maximum area of surface-to-surface contact therebetween in order to have the greatest possible heat transfer. A thermister 120 (FIG. 3) may be used to monitor the temperature of the heat sink 96, and in turn the printing elements 94. A cover 95 is shown covering the circuit board 92.

In FIG. 6, the details of the print head pressure setting arrangement are depicted in cross-section elevation. A print head pressure setting arm 54 rotates about axle 141 connecting the arm 54 to the cam 140, which engages a cover plate for the print head 90. When the arm 54 is rotated in the direction of arrow 142, the printing end of the print head 90 is moved in the direction of arrow 144 into a greater pressure contact with the sheet 14. The arm 54 can be fixed in position by turning set screw 56 into any of the notches 58, and thereby maintaining the desired pressure of the print head 90 against the sheet 14.

In FIGS. 7 and 8, the operation of the sprocket and label edge detector system is shown. The linear edges of the longitudinally extended sheet 14 pass between light sources, comprising LED's 148 and photodetectors 150 shown in broken line in FIG. 8. The edge detectors 98 can be moved horizontally along the directions of arrow 152 and fixed to the chassis frame 154 in relation to the sheet 14 by bolts 156.

Figure 9:
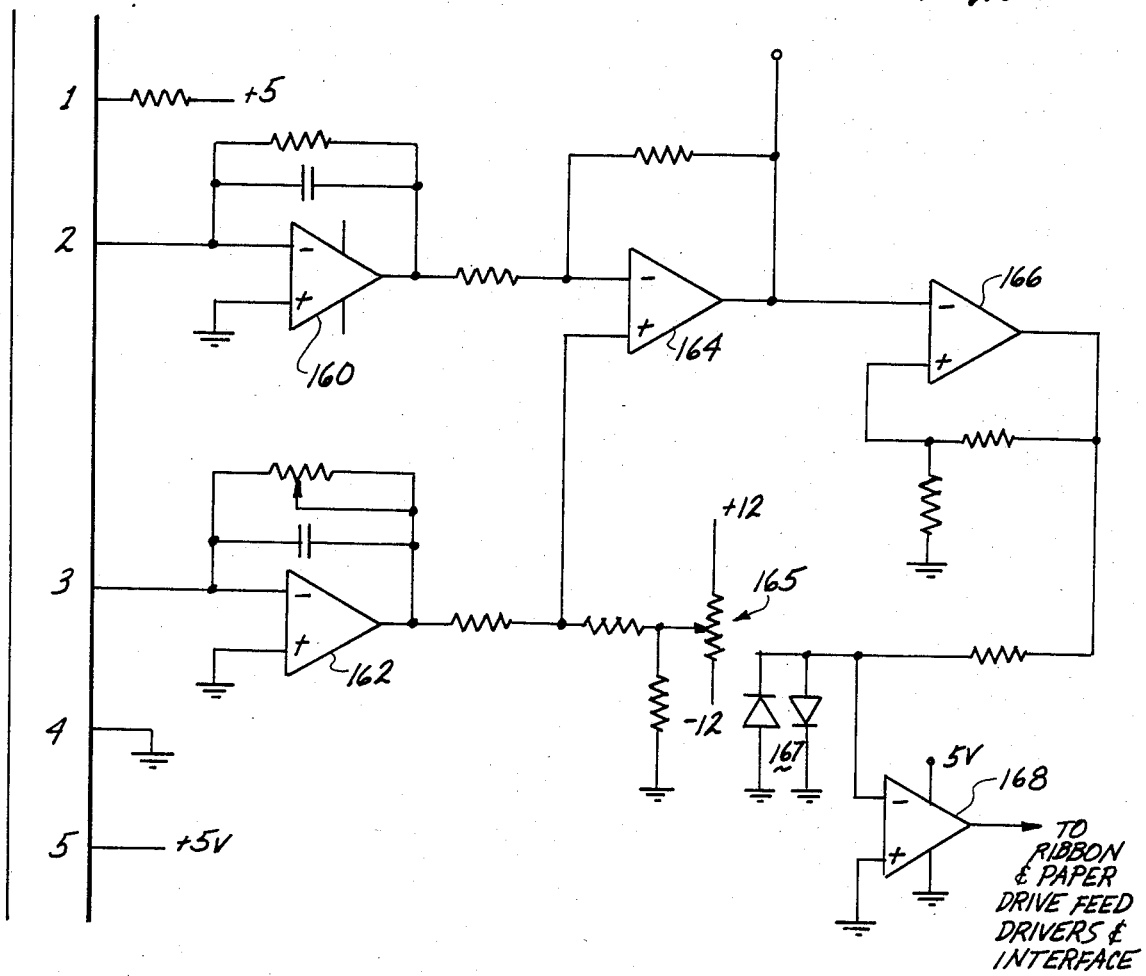
FIG. 9 is an electrical schematic of the sprocket and label edge detector circuit of the preferred embodiment.
Figure 14:
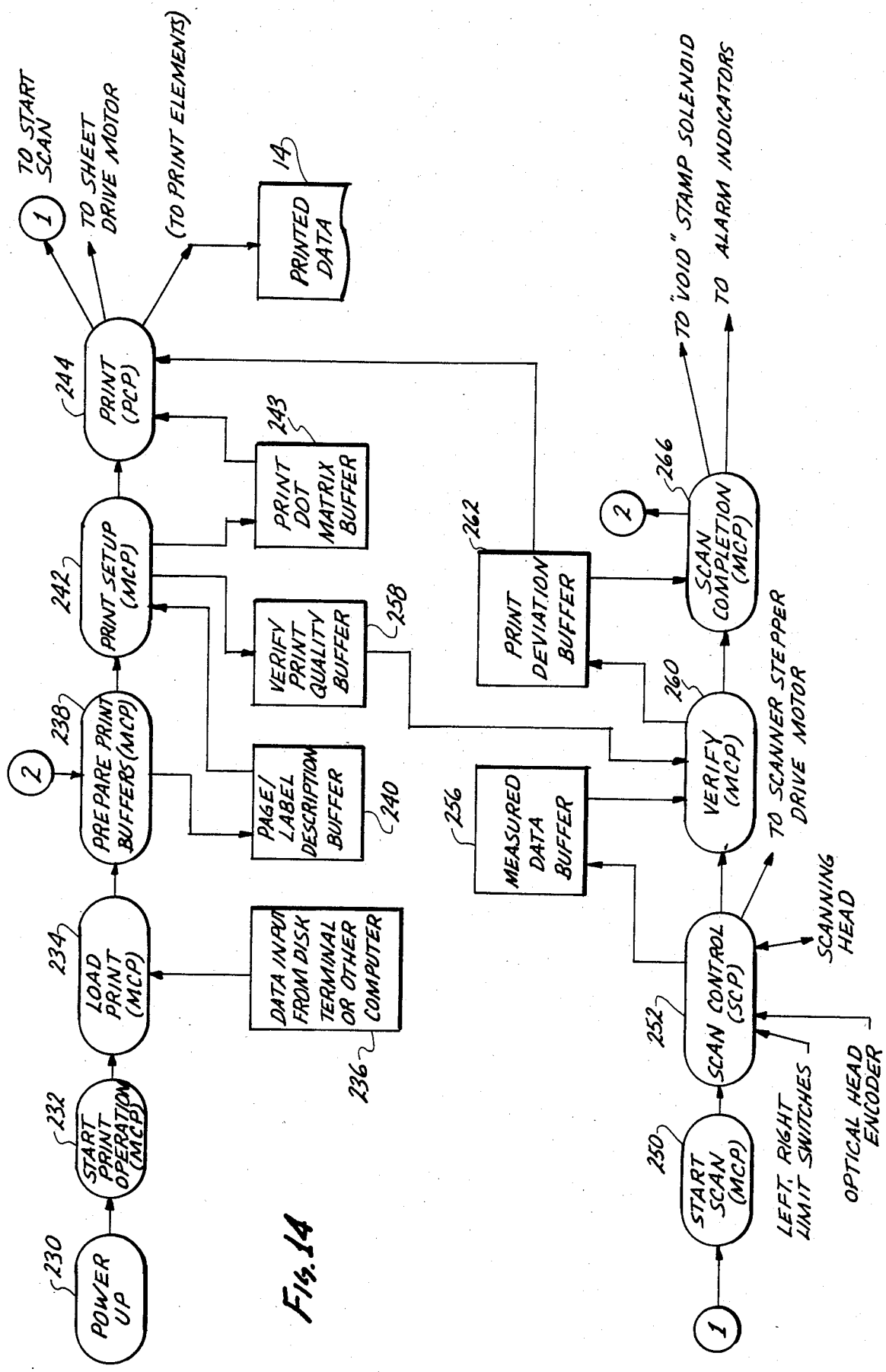
FIG. 14 is a flow diagram of the processes of the preferred embodiment of the present invention.

The operation of the edge detector is shown schematically in FIG. 9. FIG. 9 represents a detection circuit having amplifiers 160, 162 for initially receiving an electrical imput signal. The photodetectors 150 of the detectors 98 are preferably detectors capable of receiving light from the source 148 through the sheet 14. Whenever the opacity of the sheet changes, such as when the edge of a label 158 passes therethrough, the voltage level of the photodetector 150 will alter. In its quiescent state, the voltage received by amplifiers 160 and 162 from the photodetectors 150, representatively shown as points 2 and 3 in FIG. 9, will be relatively comparable, and after amplification will provide comparable inputs to difference amplifier 164. Comparator 164 will provide a low output to amplifier 167 until the inputs of amplifier 164 are different. Upon detecting a difference of at least a magnitude determined by divider 165, amplifier 164 gives a high output which is amplified by amplifier 166. Amplifier 166 forms the signal more into a digital pulse, which after forming by diodes 167 is amplified to 5 volts by amplifier 168 to produce a signal to the ribbon and paper drive feed drivers and interface 222 with the Print Control Processor (PCP) 210 (FIG. 14). A control signal controlling the paper drive motor 80 thus is generated. In the control system, the paper stepper drive motor 80 then advances sheet 14 a predetermined distance calculated as the distance between the edge detector 98 and the point of engagement by the printing elements 94 to the sheet 14.

In operation, when an edge of a portion of sheet 14 having different opacity, such as label 158, first interrupts the light path from light source 148 to the detector 150, the first amplifier 160 receives a different voltage input representative of the different opacity, causing in turn a high output signal from differential amplifier 162. This output signal is eliminated when the voltage to amplifiers 162, 164 is changed by a certain amount predetermined by divider 165, representing detection by the second photodetector 150 of the same leading edge of different opacity, such as the leading edge of label 158. The output signal of differential amplifier 164 is then low. The signal briefly generated is formed through amplifiers 166, 168 to result in a digital start signal to the print control processor to commence printing at a precisely clocked time subsequent to the receipt of the signal, calculated to be the precise time that the edge, or some set distance beyond the edge of label 158 is advanced by the paper drive motor 80 to the paper path position opposite the printing elements 94.

In FIG. 10, the solenoid 50 operating the "void" stamp is depicted. The rod of the solenoid 50 operates through linkages 52 to rotate the arm 121 of the stamp 122 in the direction of arrow 126 so that the ink pad 124 will engage or stamp impressions upon the paper 14. The solenoid 50 is actuated at any time that the processor controls determine that a bar code deviates from standard or acceptable tolerances, so as to reject the bar code so printed, whether it is a portion of a longitudinally extended sheet 14, or a particular label mounted on such a sheet. It is denominated as "void" stamp because it is contemplated that the word "void" will be formed on the ink pad for stamp printing. Any other symbol, of course, could be formed on the pad 124 to imprint whatever indicia might be desired.

In FIG. 11, an alternative mode of operating the preferred embodiment of the invention is shown. The preferred embodiment of an invention will operate equally using the print head 90, whether the paper 14 is comprised of a thermally sensitive paper which will produce an imprinted indicia upon the application of heat from the printing elements 94, or may be ordinary paper against which a thermally responsive ribbon 35 is heated so as to transfer to or melt on the paper 14 a dark imprint when the thermal ribbon 35 is heated by the pixels of the heating elements 94. In FIG. 11, the printing by use of a thermal ribbon 35 is depicted. The ribbon 35 is rolled off of ribbon roll 34 onto take-up roll 36 wound around its core 38. The path of the ribbon 35 is guided around ribbon guide 172. Platen 32 drives the sheet 14, and consequently drives the ribbon 35 which is adjacent to and held in friction contact with it by virtue of the pressure set by the print head 90. The path of the ribbon 35 is then stripped from sheet 14 by ribbon strip plate 118 and over articulated tensioning arm 119.

The tensioning arm 119 can provide a movement to a potentiometer to generate a correspondingly varying voltage as a control to the ribbon tension servo 46, and thus to increase or decrease the motor current to the direct current servo 46. The servo 46 then keeps a rotary axle pressure on the core 38 in order to keep the ribbon 35 taut and to prevent fouling with the optical scanning block 109 and light mounting block 128. The path through which ribbon 35 traverses is kept clear of the stamp 122 and its operational space, also.

Figure 12:
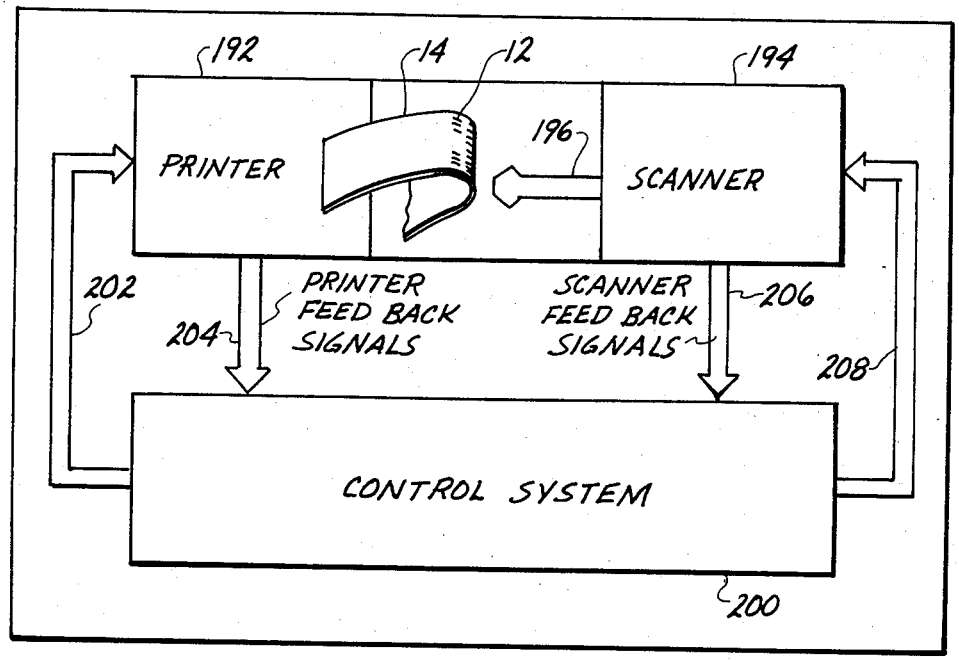
FIG. 12 is a block diagram of the operation of the preferred embodiment of the present invention.

FIG. 12 is a block diagram which diagramatically shows the interrelationships between the major elements comprising the preferred embodiment. The self-correcting printer and verifier 190 includes a printer 192 for printing indicia, such as bar code symbols on a print medium such as longitudinally extended sheet 14. Sheet 14 may include successive pages or may include successive spaced labels 158 [FIGS. 7 and 8] removably affixed to the sheet 14 for imprinting thereon. Thus successive pages or labels of sheet may have corresponding successive fields of indicia printed thereon. The printed indicia 12 is read by a scanner 194 including a reading element 196. The printer 192 is controlled by a control system 200 by control signals directed along path 202. Printer feedback signals may provide some information along path 204 to the control system 200 to assist in controlling the printer 192 in its primary printing operations. The control system 200 provides control signals along path 208 to control and operate the scanner 194 to scan printed indicia at a time subsequent to its imprinting on sheet 14. Scanner 194 also produces scanner feedback signals applied to control system 200 along path 206 which signals include a scanner output signal representative of the scanned printed indicia and also may include encoded scanner position signals which gives control system 200 information as to the position along the line at which the scanner is reading. The control system 200 receives the scanner feedback signals along path 206, and uses the scanner output signal to modify the printer control signals applied to the printer along path 202 to modify, in turn, the characteristics of the printed indicia 12.

It should be noted that the control system 200 controls the stepper motor 80 in its incremental advancement of sheet 14. The control system 200 will have received the edge or label detector sensing signal sensing the position of an edge, for example, and by sensing the incremental advances of the sheet 14, will have precise information of the location of an edge, including information of whether a label is located juxtaposed the print head. In situations where the print operation creates its own printed edges or borders, the control system 200 will have the number of incremental advances beyond the end of the last edge so as to be able to locate precisely the beginning of the next succeeding label's leading edge.

In general, the printer 192 may or may not contribute printer feedback signals along path 204 to the master control system 200. If a thermal printer is utilized, where the temperature of the printing elements are crucial, a temperature feedback signal may be returned which is generated by a thermistor mounted on the heat sink for the thermal print head and may be used to control energy applied to the printing elements, for example, by providing information for controlling the amplitude of a voltage pulse driving the printing element. Such temperature feedback control is well known in the prior art but is extremely slow and delayed in operation because of the very large thermal time lags in a thermal print head.

In instances of printing on a series of spaced, removable labels mounted on sheet 14, the printer 192 may use a label edge detector to generate label edge feedback signals at the leading edge of such labels to communicate to the control system 200 the precise location of the label, so that the control system 200 can generate print commands when the label is correctly positioned in relation to the printing elements.

It can be appreciated, that thermistor generated temperature feedback signals may not be utilized when the printer 192 is not a thermal printer, for example if it is a laser printer. Similarly, label edge detector feedback may not be utilized if the printer is not printing on sheet carried labels or similar sections.

In the preferred embodiment of the invention, which utilizes a dot matrix thermal printer, temperature feedback control of drive pulse energy content is supplemented or replaced by a much faster acting control method which scans printed indicia to determine dimensional deviation of the printed indicia from predetermined desired dimensions and quickly alters energy content of drive pulses to the print elements in accordance with such dimensional deviation to reduce the dimensional deviation of subsequent printed indicia. This is a quick acting system in which imprinted dot size is increased or decreased in accordance with the alterations of drive pulse energy content to thereby increase or decrease the dimensions of the printed indicia.

The scanner may include as its reading head 196 an optical scanning head of the preferred embodiment. The scanner output signal produced by reading head 196 represents precisely the dimensions along the scan path of the scanned printed indicia, such as bar code 12. The control system 200 operates upon the feed back scanner output signals to compute dimensional deviation of the scanned printed indicia from predetermined desired dimensions, which are stored in control system 200. The computed deviation is used to correct or modify the printer drive signals applied to the printer along path 202 from control system 200. Thus, the control system 200 can command the printer to increase or to decrease the elemental dot sizes to thereby increase or decrease the width of the bars in the code 12, in response to the magnitude of the dimensional deviation of the previously printed code 12 from its predefined desired dimensions. The computed deviation can also be used by the control system to control a "void" stamp, and to apply command signals along path 202 to reprint a voided label, page or other print field rejected by the void stamp. The control system 200 also operates to control the sheet advance drive, and also the thermal ribbon drive, if thermal ribbon is used, and controls the selection of those print head elements which are to receive print head drive signals.

In FIG. 13, a block schematic of the control system 200 is shown. The control system 200 includes a master control processor (MCP) and a print control processor (PCP) 210, which share a common random access memory (RAM) 212. The MCP 208 receives commands from a scanner control processor (SCP) 214, which has its own RAM 216. The SCP 214 is operatively connected to the scan head drivers and interface 218 from which emits the scanner drive motor control, and through which the SCP 214 receives information from the scanning head and the right and left limit signals from the limit switches. The scanner position encoder, such as the optical head encoder, generates signals interfaced by the scan head interface 218 to the SCP 214.

Information supplied through interface 218 from the scanning head includes a scanner output signal representative of the reflectance of scanned printed bars and spaces and thereby representative of the precise width of the printed bars, which information is prepared by the SCP 214 and transferred to the MCP 208 for comparison with prestored desired reflectances and dimensions for the scanned bars and spaces. The MCP 208 from such comparisons computes an averaged dimensional deviation for the scanned bars which it makes available to the PCP 210 for altering a print time control number, i.e. the Dot Time Count Reference number (FIG. 16), which is used to generate a print control signal whose time duration is proportional to the Dot Time Count Reference number. The print control signal thus is used to drive, i.e. to switch on the print head drivers 220 to set the time of the voltage pulse driving the printing elements.

In the present thermal line printer, the print head drivers each comprise a switching circuit which is switched "on" to pass current through a circuit which includes a corresponding printing element. Each head driver comprises such a switching circuit in association with a corresponding input gate and bistable memory element. Bistable memory element is setable to a "1" or a "0" value and controls the gate to pass or not to pass an applied print control signal through it to the switching circuit, selectably to drive thereby the switching circuit for the duration of the print control signal to switch voltage to the printing element. Thus, overall the entire set of head drivers can be considered as a register of memory elements each selectably controlling whether the corresponding switch can be actuated by the print control signal pulse in accordance with the "1" or "0", i.e., print or non-print, values set into and stored in the "register."

The print control signal is thus an actuating signal determining the "on" time of the application of current to the printing element, causing the printing element to heat. The printing element is in close proximity, and in some instances in contact with the print medium, such as paper. Where thermally sensitive paper is used, the printing element, when heated, will cause the thermally sensitive paper to darken or to create an image comparable in shape to the printing element. The more heat that is generated during the print cycle, the more area on the paper is darkened. Similarly, in those thermal printing operations which employ a thermal ribbon, the thermal ribbon is moved or advanced adjacent to the paper to be imprinted, and the printing element is positioned opposite the thermal ribbon from the paper. When the printing element is heated by the application of voltage, adjacent coating of the thermal ribbon is melted by the heat of the printing element, and transferred onto the paper to create the darkened image. The longer that the voltage is applied to the printing element, the more of the ribbon coating adjacent the printing element will be melted and transferred onto the paper.

Thus, it may be appreciated that the width of the line created by one or more adjacent printing elements can be widened or narrowed by the corresponding increase or decrease in the amount of time that the printing element is being heated by the application of voltage in the driving circuit. Consequently, the application of a longer or greater time duration print control signal pulse to the switch which switches current through the print element will correspondingly increase the width of the line printed by that printing element. Similarly, the width of the imprinted line can be narrowed by correspondingly decreasing the print control signal pulse duration.

The print control processor 210 also generates those signals necessary to control the sheet drive motor 80 which controls not only the advancement of the sheet, but also the advancement of the ribbon in those applications where thermal ribbon is used. The signals to drive the sheet drive motor 80 are interfaced through the ribbon and paper drive feed drivers and interface 222. Through the same interface 222, signals from the sprocket and label edge detector are received by the PCP 210, which generates the signals necessary to advance the sheet and the thermal ribbon to position the labels or other portion of the sheet to be printed in juxtaposition with the print head before signals from the PCP 210 actuate the print head drivers 220.

The MCP 208, on the basis of the comparison of the widths of the actually printed bars and their spaces with the predefined or predetermined measured widths, and of the print deviation resulting from this comparison, determines whether the deviation is within or not within tolerances. In the event that the deviation is not within tolerances, a command flows to the alarm-/voider drivers 224 to generate a signal to the "void" stamp solenoid, and to such other alarm indications as may be employed, such an alarm light, alarm sounds and the like.

FIGS. 14 and 16 present a flow diagram of the operations of the preferred embodiment of the present invention. In FIG. 14, the operation begins with power-up which activates a start print operation or routine in the MCP 208. In the start print operation, various counters and flag bits within the processors are initialized.

At the conclusion of the start print operation, the load print operation 234 is initiated within the MCP 208. The print data can come from a disk terminal 236 or from another computer. The data will include definitions of the symbols and indicia to be printed, and quality definitions against which printing is to be verified and to which later printing is to be corrected. At the conclusion of the load print operation 234, the prepare print buffer operation 238 is initiated in the MCP 208. In this operation, the page/label description buffer 240 is loaded with the data defining the symbols and indicia to be printed.

At the conclusion of the load print operation 234, the print set-up operation 242 is initiated in the MCP 208. It should be noted at this point that, except for loading some specialized information and data relating to the quality definitions and standards for the printing, the operation is conventional for printers, which customarily have operations loading page data into processor memory for controlling the printing operations.

In the print-set operation, the quality definition data is formatted into the verify print quality buffer 258 for a complete page or label of printed information. The detail of the verify print quality buffer 258 can be seen in the map diagram of FIG. 17. The buffer comprises a 32 bit word memory storing the quality standards against which the printed symbols are to be compared. In the first word is placed a Light Maximum Standard, i.e., a value representing the minimum reflectance at which and above which an unprinted area will be accepted as a space. In the first word also is stored a Light Minimum Standard, i.e., a value representing the maximum reflectance at which and below which a printed area will be accepted as a bar. Data representative of the minimum contrast is also placed in the first word. The contrast is defined as the Light Maximum minus the Light Minimum, and in the verify print quality buffer the minimum acceptable contrast of the standards for these data is stored. Further, a minimum print contrast signal (PCS) is placed. The PCS is defined as the quotient of the light maximum minus light minimum (or, the contrast) divided by the light maximum. For each bar and each space in the symbol, a word is dedicated. In the least significant digits, the nominal dimension is stored. Filling out the word, the maximum positive and negative tolerances are placed for each bar and space. The end of the symbol is signified by a word of zeros, and thereafter the same information is recorded for the second and successive symbols. The end of the buffer is signified by two zero words.

In the print set-up operation the print dot matrix buffer 243 is also prepared. All data necessary to specify the printing elements to be energized and those not to be energized are placed in the print dot matrix buffer 243 for a complete page, label or other field of printed information. In the thermal printer of the preferred embodiment, a printed row is made up of 1,728 dots across the width of the sheet 14, each of these dots being printed or not printed by its corresponding printing element in accordance with the requirements of the symbol or line to be printed. All the information required for printing such a printed row, and for printing all successive printed rows on a page or label, is stored in the print dot matrix buffer 243 by the MCP 208 during the print set-up operation 242. Each print or dot row is stored in the buffer 243 as a corresponding row of "1"s and "0"s, i.e. mapped into the binary memory cells of the words of the print dot matrix buffer 243. In successive print operations, each successive dot row is read out of the print dot matrix buffer 243 and copied through an intermediate dot row buffer into the corresponding bistable memory element of each print head driver, so that the array of print head drivers is switched, upon actuation by the print control signal, "on" or "off" in accordance with the contents, i.e. the "1"s and "0"s of the corresponding row of the print dot matrix buffer 243.

In many printers, the printing is made by a rectangular dot matrix of dots which are either activated or energized, or not in order to form a symbol on the printed sheet. The preferred embodiment of the present invention, uses a thermal line printer where the matrix is, in effect, a horizontal row of printing elements against which the sheet is moved vertically.

As an example, for bar code printing in the print set-up operation, the MCP 208 may register into the print dot matrix buffer 243 signals to determine which of the print control drivers, and consequently which of the printing elements 94 are to be turned "on" during the print cycle to create the lines in the bar code, and which of the printing elements are to be left "off" to create spaces between the bars. The resultant picture formed on the printed page is the result of printing element dots arranged in a matrix of dots and spaces, i.e., a rectangular array of rows and columns of dots. The pattern of which of the particular dots are to be energized and thus heated, and which ones are to be left "off" in order to form the desired image on the printed paper, are mapped into the binary memory cells of the print dot matrix buffer 243.

At the conclusion of the print set-up operation 242, the print operation 244 is initiated in the PCP 210. The print dot matrix buffer 243 is available to the PCP 210, and from such data the sheet drive motor 80 is incremented, and selection signals are provided to establish which of the printing elements are to be energized for each step of the stepper motor 80. The symbols then are printed on the sheet 14. Further, the print operation initiates the scanning operations, as indicated by the connection 1-1 in the diagram of FIG. 14.

The scanning operations are initiated by the initiation of the start scan operation 250 in the MCP 208. Similar to the start print operation, the start scan operation initializes counters and flag bits. At the conclusion of the start scan operation 250, the scan control operation 252 is initiated in the SCP 214. In scan control, the operation of the scanning or reading of the printed sheet or labels is timely initiated. When the printed symbols are moved into proper scanning alignment for the scanning head, the scanning head is moved in a double traverse across the printed line of symbols, for example, bars and spaces. The control command initiates the scanner stepper drive motor to move the scanning head from its quiescent or nesting position on the right of the scan path, and the scanning head 100 reads the printed line from right to left in a first traverse or pass, as representatively shown in FIG. 15 of the drawings. The first pass will appear to the sheet 14 to be at a slight downward slope to the left as the sheet 14 will be moved during the pass. The movement of the sheet 14 will be, for one traverse in the preferred embodiment approximately 0.25 inch, and therefore the double pass will be approximately 0.5 inch, so that the entire scanning operation will be accomplished within the pass-by of the printed line. When the scanning head 100 interrupts the light path of the left limit switch 111, the scanning is reversed in its traverse to pass from the left back to the right, along the lower traverse or pass line as diagramatically shown in FIG. 15. The optical head encoder 60 presents information to the SCP 214 during scan control operation 252 so that the scan read starts at the correct line or lateral position when the scanning head 100 is at the symbol to be verified.

Figure 18:
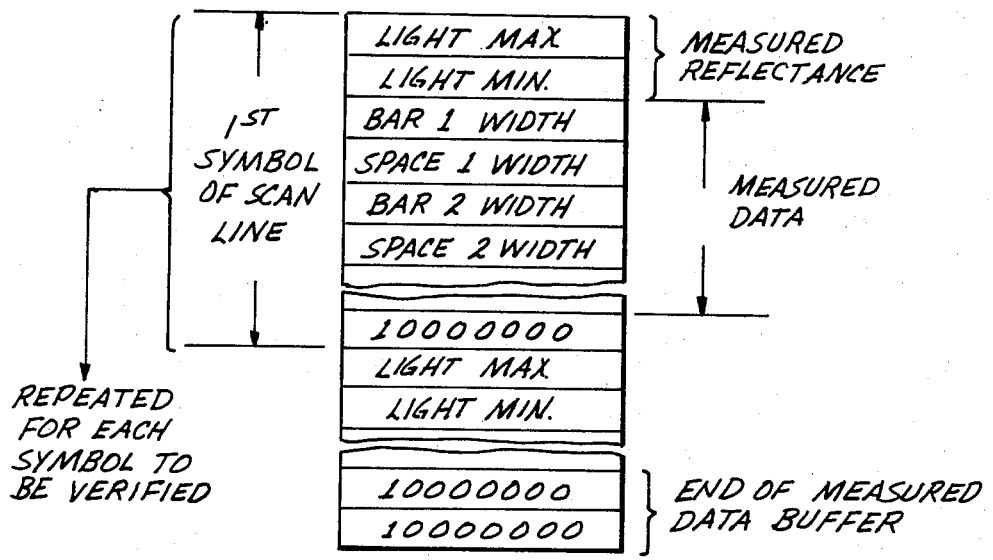

In the first traverse pass, the scanning head output signal provides a measure of the reflectance of the bars and spaces, and SCP 214 places the measured Light Maximum reflectance (i.e., the maximum reflectance of the spaces) and the Light Minimum reflectance (i.e., the minimum reflectance of the bars) into the measured data buffer 256, the details of which are seen more clearly in FIG. 18. In the reverse traverse from left to right, the transitions of the output signal are utilized to determine the vertical boundaries of bars and spaces, and thus the precise dimensions of each bar and space. In the scan control operation, the width of each bar and of each space for each symbol is representatively placed in the measured data buffer 256. A word in the buffer is dedicated for each bar and each space, as well as for the measured Light Maximum and Light Minimum. The end of the symbol is signified in the buffer 256 by a word of zeros with a "1" in the most significant digit. The end of the buffer is signified by two successive words of zeros with a "1" in the most significant digit, as is shown in FIG. 18.

At the conclusion of scan control operation 252, the completed measured data of buffer 258 are made available to the MCP 208, by being copied thereto through the SCP 214, and the verify operation 260 is initiated in the MCP 208. In the verify operation, the MCP 208 compares the measured data with the data in the verify print quality buffer 258, and computes deviations of the bar and space dimensions, Light Maximums and Light Minimums, all read by the scanning head on the one hand, from the corresponding desired bar and space dimensions and reflectance standards established in the verify print quality buffer 258 on the other hand. The completed deviation information is stored in the print deviation buffer 262 seen more clearly in detail in FIG. 19 of the drawings. For each symbol, the average of deviations of all the bars is computed and placed in the first word dedicated to the symbol, with a reservation of the most significant digit for purposes that will be discussed below. In the second word dedicated to that symbol, is placed a count of the number of bars and spaces in a symbol which are out of tolerance specification with respect to the corresponding nominal dimensions. Further, in the second word, if any of the PCS, Light Maximum or Light Minimum values are outside the bounds set in the verify print quality buffer 258, corresponding out-of-bound indicating flags are placed in the, respectively, most, next most and third most significant digits. In the third word dedicated to the symbol, a computed count is placed of the number of bars and spaces which exceed the tolerance by a predetermined gross amount, which may be a multiple of the normal tolerance.

At the completion of the verify operation 260, the page/label scan completion operation 266 is initiated in the MCP 208. In the page/label scan completion step 266, the average bar, space and light contrast deviations for an entire line as placed in the print deviation buffer 262 are seen (FIG. 19). If all bits in the first and second words for all symbols of a page or label are "0", a normal print command is transmitted through line or connection 2-2, shown in FIG. 14, to initiate the prepare print buffer 238 for its next page or label in the ordered course. However, if any bit in words one or two are "1", that is if any bar, space or light contrast measurement exceeds the predetermined tolerance limit, a command is given in conjunction with operation 238, after completing the page or label, to reprint the page or label which in the initial printing exceeded the deviation tolerances preset into the verify print quality buffer 258. If the deviations are within predetermined tolerances, a normal print instruction can be given in the connection 2-2 so that the printing operation following after operation 238 may proceed as set forth above. Additionally, in the event that the width dimensions of the bars of a bar code of a particular page or label exceed that of predetermined tolerances, the page/label scan completion step includes a command to the "void" stamp solenoid to actuate an imprint upon the label as "void," and to actuate visual and audio alarms as may be desired. If any bit in the third word indicates by a "1" a "gross" deviation, a command is given to stop all printing and to alert operators to the gross error.

The print deviation buffer 262 is made available to the PCP 210, which in its print operation 244 can generate commands to self-correct the time duration of the voltage applied to the individual printing elements, so as to tend to reduce print bar and space width deviations, as will be explained in greater detail below.

In FIG. 16, the interaction of the print deviation measurements from the buffer 262 in the print operation 244 in the PCP 210 to achieve the self-correction of the printing is diagramatically set forth. The print step 244 is initiated at the completion of the print set-up operation 244 in the MCP 208. The bar width deviations from the print deviation buffer 262 are summed and averaged for a full line, and this average resultant bar deviation for the line is scaled 270 to put the count in compatible form to that already in use in the PCP for generating the print control signals driving the print head drivers 220. As the flow diagram indicates, during the start print operation, a flag A 272 is set at zero, so that for a first flow sequence, i.e. each first line, the scaled bar deviation 270 is subtracted from the dot time count standard to produce a dot time count reference 274. The flag A 272 is then set at "1" and a counter A is set to zero. The negative or complemental value of the dot time count reference is stored in counter A. After counter A receives a negative time count reference value, counter A is incremented by a fast clock until it overflows, during which time a positive print control pulse is sent to the print head drivers 220 by the PCP 210 in the print step 244 of FIG. 14. When the counter A has overflowed, the voltage "on" pulse 278 to the print head drivers is terminated. In subsequent line cycles, when the flag A 272 is "1", the scaled bar deviation is subtracted from the old dot time count reference to produce a new dot time count reference 275 for storing in counter A. Thus it can be seen that the dot time count reference is a print time control number or value generated by the print operation 244 of the PCP that controls the time duration of the print control signal. The dot time count reference is updated and altered in accordance with the calculated dimensional deviations so as to tend to reduce these deviations.

The foregoing detailed description of our invention and a preferred embodiment, both as to apparatus and as to method, is illustrative of specific embodiments only. It is to be understood, however, that additional embodiments may be perceived by those skilled in the art. The embodiments described herein, together with those additional embodiments are considered to be within the scope of the present invention.

I claim:
1. A self-correcting printer-verifier to imprint indicia on a longitudinally extended sheet comprising:
   a. printing means having a print head responsive to applied drive signals for printing indicia on the sheet;
   b. scanning means operable for scanning the indicia printed on the sheet for producing a scanner output signal representative of the physical dimension of the printed indicia;
   c. control means connected to said scanning means and to said printing means, said control means being operable for generating print drive signals and applying said drive signals to said print head to actuate printing by said print head;
   d. said control means including print characteristic adjusting means responsive to said scanner output signal for altering said drive signals to correspondingly alter at least the physical dimension characteristics of subsequently imprinted indicia wherein said print characteristic adjusting means operates upon said scanner signal to compute the dimensional deviation of imprinted indicia from predetermined desired dimensions and alters the energy content of said drive signals in accordance with the value of such dimensional deviation to reduce the dimensional deviation of subsequently printed indicia and further including a void imprinter selectively actuable for printing a void indication on a field of printed indicia on the sheet, said control means including void determination means for actuating said void imprinter when the computed dimensional deviation exceeds a predetermined limit.

2. A self-correcting printer-verifier to imprint indicia on a longitudinally extended sheet comprising:
   a. printing means having a print head responsive to applied drive signals for printing indicia on the sheet;
   b. scanning means operable for scanning the indicia printed on the sheet for producing a scanner output signal representative of the physical dimension of the printed indicia;
   c. control means connected to said scanning means and to said printing means, said control means being operable for generating print drive signals and applying said drive signal to said print head to actuate printing by said print head;
   d. said control means including print characteristic adjusting means responsive to said scanner output signal for altering said drive signals to correspondingly alter at least the physical dimension characteristics of subsequently imprinted indicia wherein said print characteristic adjusting means operates upon said scanner signal to compute the dimensional deviation of imprinted indicia from predetermined desired dimensions, and alters the time duration of said drive signals in accordance with the value of such dimensional deviation to reduce the dimensional deviation of subsequently printed indicia further including a void imprinter selectively actuable for printing a void indication on a field of printed indicia on the sheet, said control means including void determination means for actuating said void imprinter when the computed dimensional deviation exceeds a predetermined limit.

3. A self-correcting printer-verifier to imprint indicia on a longitudinally extended sheet comprising:
   a. pinting means having a print head responsive to applied drive signals for printing indicia on the sheet;
   b. scanning means operable for scanning the indicia printed on the sheet for producing a scanner output signal representative of the physical dimension of the printed indicia;
   c. control means connected to said scanning means and to said printing means, said control means being operable for generating print drive signals and applying said drive signals to said print head to actuate printing by said print head;
   d. said control means including print characteristic adjusting means responsive to said scanner output signal for altering said drive signals to correspondingly alter at least the physical dimension characteristics of subsequently imprinted indicia wherein the printed indicia comprise indicia code symbols comprising aliged imprinted indicia having width separated by non-imprinted spaces and wherein said print characteristic adjusting means operates upon the said scanner signal to compute the deviation in width of imprinted indicia from predetermined desired width dimensions, and alters the energy content of said drive signals in accordance with the value of such bar width deviation to reduce the indicia width deviation of subsequently imprinted indicia code symbols.

4. The printer-verifier of claim 3, wherein said print head of said printing means is adapted to print a series of dots in a dot matrix by thermal printing, said print head including a plurality of individually actuable printing elements arranged in a predetermined dot array, element being responsive to application of a drive signal thereto, for generating heat to imprint a corresponding spot on the sheet where the size of said spot is related to the energy content of the applied drive signal.

5. The printer-verifier of claim 3 which further includes a void imprinter selectively actuable for printing a void indication on a field of printed indicia on the sheet, said control means including void determination means for actuating said void imprinter when the computed dimensional deviation exceeds a predetermined limit.

6. A self-correcting printer-verifier to imprint indicia on a longitudinally extended sheet comprising:
   a. printing means having a print head responsive to applied dirve signals for printing indicia on the sheet;
   b. scanning means operable for scanning the indicia printed on the sheet for producing a scanner output signal representative of the physical dimension of the printed indicia;
   c. control means connected to said scanning means and to said printing means, said control means being operable for generating print drive signals and applying said drive signals to said print head to actuate printing by said print head;
   d. said control means including print characteristic adjusting means responsive to said scanner output signal for altering said drive signals to correspondingly alter at least the physical dimension characteristics of subsequently imprinted indicia wherein said print characteristic adjusting means operates upon said scanner signal to compute the dimensional deviation of imprinted indicia from predetermined desired dimensions, and alters the time duration of said drive signals in accordance with the value of such dimensional deviation to reduce the dimensional deviation of subsequently printed indicia wherein the printed indicia comprise bar code symbols comprising aligned imprinted bars separated by non-imprinted spaces and wherein said print characteristic adjusting means operates upon said scanner output signal to compute the deviation in width of imprinted bars from predetermined desired width dimensions, and alters the time duration of said drive signals in accordance with the value of such bar width deviation to reduce the bar width deviation of subsequently imprinted bar code symbols.

7. The printer-verifier of claim 6 wherein said print head of said printing means is adapted to print a series of dots in a dot matrix by thermal printing, said print head including a plurality of individually actuable printing elements arranged in a predetermined dot array, each element being responsive to application of a drive signal thereto, for generating heat to imprint a corresponding spot on the sheet where the size of said spot is related to the energy content of the applied drive signal.

8. The printer-verifier of claim 6 which further includes a void imprinter selectively actuable for printing a void indication on a field of printed indicia on the sheet, said control means including void determination means for actuating said void imprinter when the computed dimensional deviation exceeds a predetermined limit.

9. The printer-verifier of claim 8 wherein said control means normally controls said printing means to print successive fields of indicia said control means being operable after an actuation of said void imprinter for reprinting the voided field.

10. A self-correcting printer-verifier to imprint indicia on a sheet comprising:
   a. printing means having a print head operable for printing indicia on the sheet;
   b. scanning means for scanning the indicia printed on the sheet for producing a scanner output signal representative of the printed indicia;
   c. a void imprinter selectively actuable for printing a void indication on a field of imprinted indicia on the sheet;
   d. control means connected to said scanning means and to said printing means, said control means for normally controlling said printing means to print successive fields of printed indicia, said control means including means for operating upon said scanning signals to compute out of limit condition for the dimension characteristics of the printed indicia, said control means being responsive when a computed out of limit condition exists for actuating said void imprinter to imprint a void indication on the corresponding field of printed indicia.

11. The printer-verifier of claim 10 wherein said control means is operable after an actuation of said void imprinter for controlling said printing means to reprint the voided field of indicia.

12. The method of operating a printer having a print head responsive to applied head drive signals for printing indicia on a sheet, said method comprising the steps of:
   a. scanning the indicia imprinted on the sheet to produce a scanner output signal representative of the scanned printed indicia,
   b. operating upon the scanner output signal signal to determine dimensional deviation of the scanner imprinted indicia from predetermined desired dimensions,
   c. altering the energy content of the head drive signals in accordance with such dimensional deviation to reduce the dimensional deviation of subsequently imprinted indicia, and
   d. printing a void indication on the sheet in association with the scanned printed indicia when the determined dimensional deviation exceeds predetermined limits.

13. The method of operating a printer having a print head responsive to applied head drive signals for printing indicia on a sheet, said method comprising the steps of:
   a. scanning the indicia imprinted on the sheet to produce a scanner output signal representative of the scanned printed indicia,
   b. operating upon the scanner output signal to determine dimensional deviation of the scanned imprinted indicia from predetermined desired dimensions,
   c. altering the energy content of the head drive signals in accordance with such dimensional deviation to reduce the dimensional deviation of subsequently imprinted indicia, and
   d. after a void indication has been printed, reprinting the imprinted indicia in a successive print field.

14. The method of operating a dot matrix printer adapted for printing bar code symbols and having a print head responsive to applied head drive signals for printing dot elements of such symbols on a sheet, said method comprising the steps of:
   a. scanning bar code symbols printed on the sheets to determine physical dimensional deviation of the scanned bar code signals from predetermined desired physical dimensions;
   b. altering the energy content of the head drive signals in accordance with such determined physical dimensional deviation to alter the size of subsequent imprinted dot elements to reduce the physical dimensional deviation of subsequently imprinted bar code symbols, including scanning bar code symbols printed on the sheet to determine the dimensional deviation in width of the scanned bars from determined desired width dimensions.

15. The method of claim 14 wherein in said altering step, step b, the energy content of the head drive signals is altered by altering the time duration of the head drive signals in accordance with the determined dimension deviation.

16. The method of claim 15 wherein in said altering step, step b, the energy content of the head drive signals is altered by altering the voltage duration of the head drive signals in accordance with the determined dimension deviation.

17. A method of determining in a printer the leading edge of each of a series of successively positioned labels through the printer into position adjacent printing elements within the printer, comprising the steps of:
   a. moving each label successively through a first light path comprised of a first light source and a first photodetector capable of detecting light through said label;
   b. producing a first electrical signal representative of the change in opacity when the label is moved through the first light path;
   c. further moving the label through a second light path comprised of a second light source and a second photodetector capable of detecting light through said label;
   d. producing a second electrical signal representative of the change in opacity and comparable in magnitude to said first electrical signal when the label is moved through the second light path;
   e. comparing the first electrical signal with the second electrical signal and producing from this comparison a digital initiate signal for initiating an operation routine in a control processor when said first and said second electrical signals are comparable in magnitude, whereby a print operation routine is initiated operating the printer to print indicia on said label when said label is positioned adjacent said printing elements where, after each of the steps of producing the first and the second electrical signals, said electrical signals are not compared in the comparing step unless each of said electrical signals exceeds a predetermined minimum voltage representative of a minimum change in opacity.

* * * * *